(12) United States Patent
McKee

(10) Patent No.: US 9,833,728 B2
(45) Date of Patent: Dec. 5, 2017

(54) FLUID SCRUBBING APPARATUS

(71) Applicant: Sheldon McKee, Rockyview, CA (US)

(72) Inventor: Sheldon McKee, Rockyview, CA (US)

( * ) Notice: Subject to any disclaimer, the term of this patent is extended or adjusted under 35 U.S.C. 154(b) by 0 days.

(21) Appl. No.: 15/154,940

(22) Filed: May 13, 2016

(65) Prior Publication Data

US 2016/0332093 A1 Nov. 17, 2016

Related U.S. Application Data

(60) Provisional application No. 62/161,882, filed on May 15, 2015.

(51) Int. Cl.
 *B01D 19/00* (2006.01)

(52) U.S. Cl.
 CPC ................ *B01D 19/0005* (2013.01)

(58) Field of Classification Search
 None
 See application file for complete search history.

(56) References Cited

U.S. PATENT DOCUMENTS

| | | | | |
|---|---|---|---|---|
| 3,385,031 A * | 5/1968 | McMinn | ............ | B01D 19/0042 96/191 |
| 3,725,012 A * | 4/1973 | Gower | .............. | F01N 3/00 252/372 |
| 3,977,972 A | 8/1976 | Bloch et al. | | |
| 4,583,998 A * | 4/1986 | Reid | .................. | B01D 19/0042 210/801 |
| 4,927,433 A * | 5/1990 | Wieland | ............ | B01D 19/0047 95/12 |
| 6,537,458 B1 * | 3/2003 | Polderman | ............ | B01D 17/00 210/188 |
| 7,347,945 B2 * | 3/2008 | Amado | .............. | B01D 17/0211 166/267 |
| 8,101,089 B2 * | 1/2012 | Drewelow | ......... | B01D 19/0042 210/188 |
| 2006/0118064 A1 * | 6/2006 | Istre | .................... | B01D 19/0005 122/414 |
| 2013/0312614 A1 * | 11/2013 | Zainal Abidin | .... | B01D 17/0211 96/242 |
| 2016/0089626 A1 * | 3/2016 | Kilian | .................... | C12M 47/18 95/19 |

FOREIGN PATENT DOCUMENTS

EP  0 680 509 B1  12/1996
EP  2 770 041 A1  8/2014

* cited by examiner

*Primary Examiner* — Duane Smith
*Assistant Examiner* — Phillip Shao
(74) *Attorney, Agent, or Firm* — Sander R. Gelsing

(57) ABSTRACT

In one aspect there is provided a fluid treatment system for treating a contaminated fluid having a gaseous contaminant mixed or dissolved in the liquid portion thereof. The system comprises a generally enclosed and substantially airtight container defining an interior volume. The container comprises an inlet to receive the contaminated fluid, a gas outlet to discharge any gaseous contaminant and a liquid outlet to discharge any liquid that may be separated from said contaminated fluid. During operations, the container is sealed to maintain a seal between the interior volume and any outside environment, so as to prevent the escape of any liquids and gasses out of the interior volume, except as may be provided for via the inlet, the gas outlet or the liquid outlet. Also during operations, a continuous headspace is maintained between the at least one inlet and the at least one gas outlet.

6 Claims, 4 Drawing Sheets

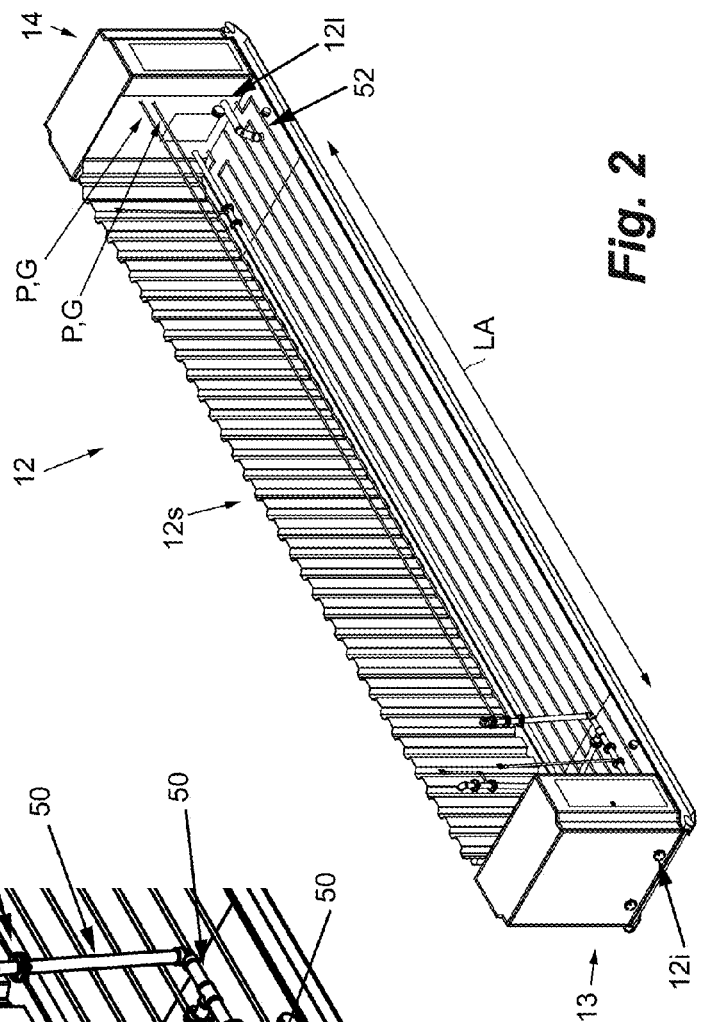
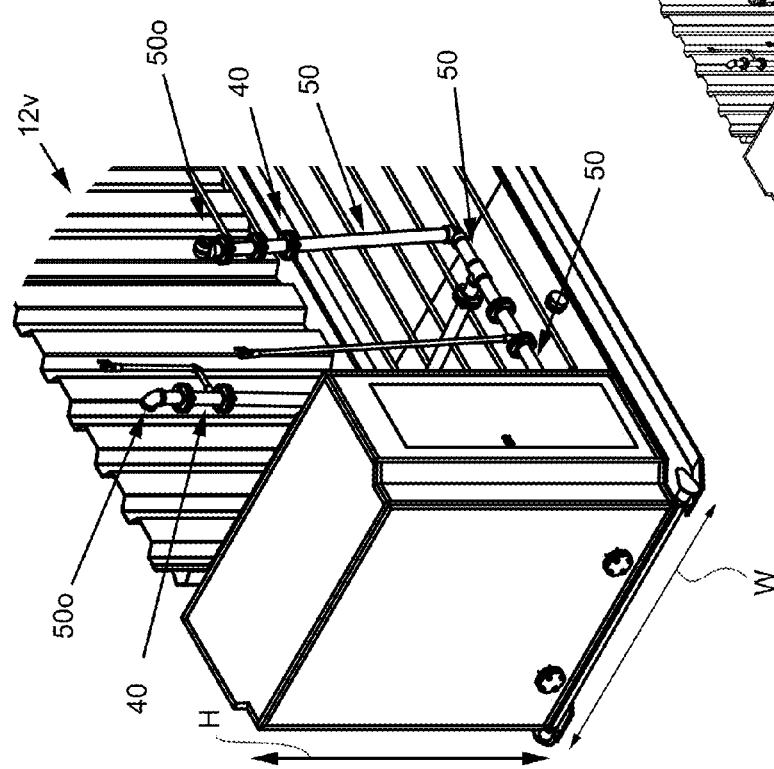

FLUID SCRUBBING APPARATUS

CROSS REFERENCE TO RELATED APPLICATION

This application is a non-provisional application of U.S. Provisional Patent Application Ser. No. 62/161,882 filed May 15, 2015 and entitled "FLUID SCRUBBING APPARATUS", the entirety of which is incorporated herein by reference.

FIELD OF THE INVENTION

The field of present invention relates generally to contaminated fluid scrubbing equipment and, more particularly, to equipment and systems suitable for scrubbing hydrogen sulfide from fluids such as sour water and sour oil without introducing a chemical scavenger into the liquid portion of the contaminated fluid and without the need for a large scale facility.

BACKGROUND OF THE INVENTION

The background information discussed below is presented to better illustrate the novelty and usefulness of the present invention. This background information is not admitted prior art.

Fluids may contain contaminants that are gaseous at normal atmospheric conditions, but which are also often mixed or dissolved in the liquid portion of that fluid. Volatile Organic Compounds (VOC) are one example of a group of such contaminants. Another example is the contaminant hydrogen sulfide (H2S) which may be present in water, crude oil or other hydrocarbon fluids. Hydrogen sulfide can be present naturally in well water and in crude oil, or it may be introduced into wastewater via industrial processes. Water and crude oil will be referred to as sour, if they contain substantial amounts of hydrogen sulfide.

Hydrogen sulfide is a colorless gas with the characteristic foul odor of rotten eggs. It is also very poisonous, corrosive, flammable, and explosive. The industry considers oil or water containing 100 parts per million ("ppm") (0.01%) sulfur sour oil and sour water. Although this is the minimum level, oil wells and water can contain higher amounts. Oil and water can contain hydrogen sulfide up to 300,000 ppm (30%) at the immediate gas/liquid interphase, the vapor space in a tank or container, and the atmosphere surrounding a spill. At higher concentrations, hydrogen sulfide is toxic and deadly. It is therefore desirable to remove or to inactivate hydrogen sulfide contaminants.

A traditional method of removing or inactivating hydrogen sulfide from fluids such as crude oil or water is to use a chemical scavenger, for example 1,3,5-tri-(2-hydroxyethyl)-hexahydro-s-triazine (HHTT, CAS number 4719-04-4), usually simply referred to as triazine. This hydrogen sulfide scavenger reacts with the hydrogen sulfide converting it to a more non-volatile product, which may be then subsequently removed from the fluid being treated or simple left in solution. However even though these products are non-volatile or less toxic, it is often undesirable to leave scavenger end-products within the treated fluid (since the overall "sulfur" content has not been reduced, but has merely been converted to a less toxic form). Therefore additional steps may need to be taken to remove the scavenger end-products from the fluid, resulting in additional costs and more complex equipment.

Additionally, amine-based hydrogen sulfide scavengers are also known to form an unwanted dithiazine byproduct (particularly if the scavenger is "over-spent"). This byproduct material is also known as amorphous dithiazine, and appears to begin forming when triazine is around 60% spent. This amorphous dithiazine byproduct is exceptionally insoluble and substantial quantities can deposit throughout a fluid processing system. Dithiazine can form blockages in processing equipment, storage tanks, truck tanks and disposal wells. Cleanup procedures are time consuming and difficult. Often, the equipment has to be taken off-line so such deposits can be manually chipped away. The industry places much effort and incurs great cost in the prevention and treatment of dithiazine buildup.

Hydrogen sulfide treatment systems also often take the form of elaborate systems employing complex components such as packing, porous media or contact cells to increase surface areas and create tortuous fluid paths (e.g. to increase scavenger and contaminant interaction), fluid nozzles or distributors (e.g. to attempt to evenly distribute scavenger or contaminated fluid over the packing), demister pads (e.g. to remove contaminated liquid or scavenger droplets entrained in a vapor stream) and sparge-bars (e.g. to introduce a scavenger into the fluid). These elaborate systems typically are in the form of tall, upright vessels or towers, to increase the time that fluid or scavenger trickles downward through a deep layer of packing (or to increase the time that lighter fluids take to move up through a deep layer of contaminated fluid), thereby allowing the system to fully treat the contaminated fluid.

However, such upright/vertical orientation makes these systems undesirable for use in remote locations, because the upright vessel will often have to be transported in a horizontal orientation (e.g. to fit underneath bridges and to meet local vehicle and traffic regulations) and then be lifted or tilted upright from a transport vehicle to be installed at the remote location. For example, the current Commercial Vehicle Dimension and Weight Regulation under the Traffic Safety Act of the Province of Alberta, Canada sets the maximum width of a semi-truck, including any load, at 2.6 meters (approximately 8.53 feet) and sets the height of the highest point of the semi-truck, including any load, at 4.15 meters (approximately 16.6 feet) from the surface of the highway. The packing, porous media or contact cells may also not be suitable for use with crude oil and/or may be expensive to use and replace.

Finally, it is known that hydrogen sulfide contaminated water can may sometimes be treated through a process of air stripping. Air stripping typically occurs in an upright/vertical tower where the contaminated water is induced into the top of the tank and distributed over top of a layer of packing. The packing is designed to increase the surface area of the air-water interface, allowing a more complete volatilization. As the water descends, air is introduced separately from the water, near the bottom of the tank. The air then rises through the packing to stripping off the hydrogen sulfide. The water collects at the bottom with reduced hydrogen sulfide concentration and may exit through a sump. The hydrogen sulfide will then rise out of the top of the tank in a gaseous state. However, this type of air stripping is normally only suitable for contaminated water with lower concentrations of hydrogen sulfide, it may not work well with crude oil and typically results in the packing becoming plugged or contaminated. Often the water collected at the bottom of the tank will require further treatment to fully remove the hydrogen sulfide (e.g. with chlorination) and, if it works, it typically requires tall, upright vessels or towers with sufficient packing. Moreover, the use of packing complicates this system and adds to the cost, including ongoing operating material costs as packing needs to be replaced.

Therefore, what is needed is a simple, cost-effective apparatus, system and method to efficiently scrub contaminants such as hydrogen sulfide from fluids without introducing a chemical scavenger into the liquid portion of the contaminated fluid, without the need for packing, suitable for transport on the highways and without requiring complex and tall systems and apparatus. Preferably, and because the liquid portion of the fluid has commercial value (e.g. the liquid crude oil), the contaminant will be substantially removed from the liquid portion of such contaminated fluid, without requiring a secondary treatment for that liquid portion.

SUMMARY OF THE INVENTION

In an embodiment of the invention, there is provided a fluid treatment system for treating a contaminated fluid having a gaseous contaminant mixed or dissolved in the liquid portion thereof. The system comprises a generally enclosed and substantially airtight container defining an interior volume. The container comprises an inlet to receive the contaminated fluid, a gas outlet to discharge any gaseous contaminant and a liquid outlet to discharge any liquid that may be separated from said contaminated fluid. During operations, the container is sealed to maintain a seal between the interior volume and any outside environment, so as to prevent the escape of any liquids and gasses out of the interior volume, except as may be provided for via the inlet, the gas outlet or the liquid outlet. Also during operations, a continuous headspace is maintained between the at least one inlet and the at least one gas outlet.

In a preferred embodiment of the invention, the system further comprises: (i) a recycling loop fluidly connecting the liquid outlet to the inlet, (ii) a gas scrubber to receive any gaseous contaminants exiting the gas outlet, and (iii) a source of carrier gas premixed into the contaminated fluid.

BRIEF DESCRIPTION OF THE DRAWINGS

Referring to the drawings, several aspects of the present invention are illustrated by way of example, and not by way of limitation, in detail in the figures, wherein:

FIG. 2 is a sectioned perspective view of an embodiment of a container suitable for use in the fluid treatment system of the present invention;

FIG. 3 is an enlarged view of a portion of FIG. 2;

DEFINITION SECTION

Figure 1:
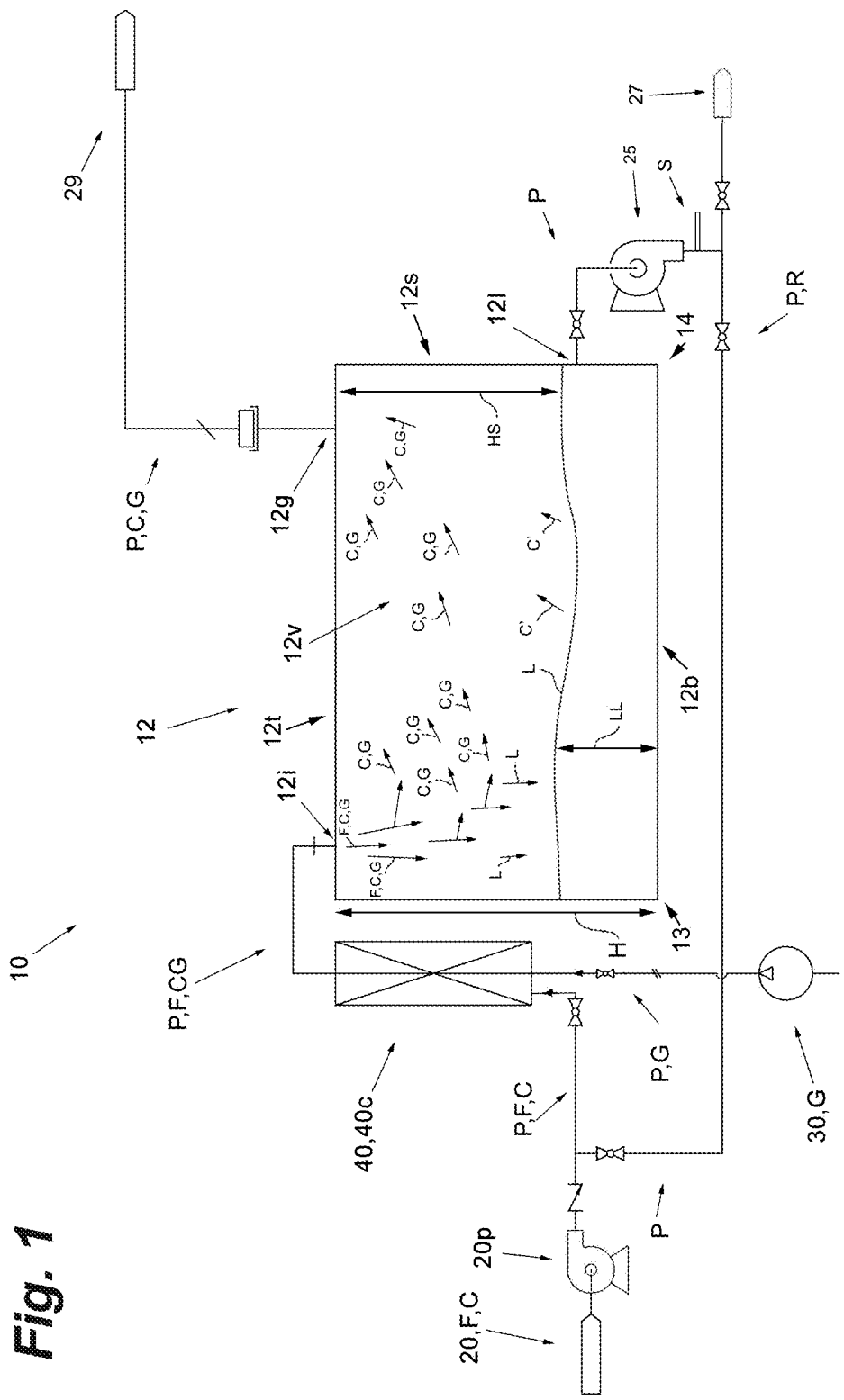
FIG. 1 is a diagrammatic view of a first embodiment of the fluid treatment system of the present invention.
Figure 6:
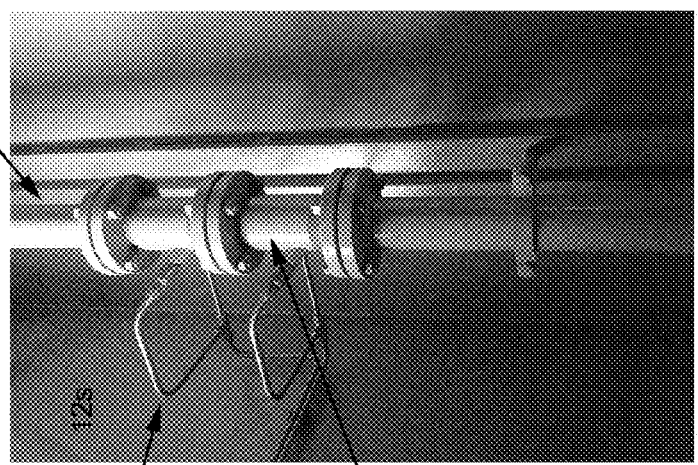
FIGS. 4, 5 and 6 are interior perspective views of one embodiment of a mixer and diverter.
Figure 5:
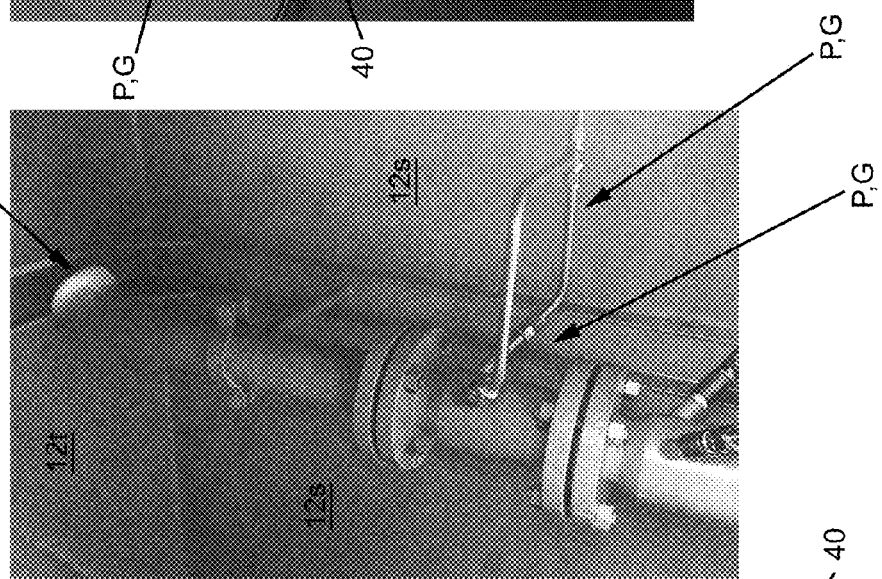
Figure 4:
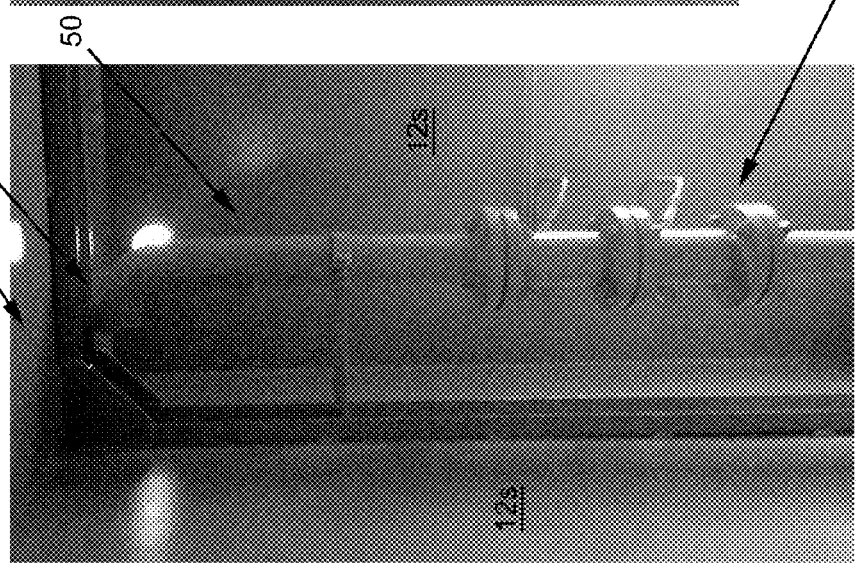

Horizontal plane, as used herein, refers to a plane that is horizontal at a given point if it is perpendicular to the gradient of the gravity field at that point, in other words, apparent gravity is what makes a plumb bob hang perpendicular to the plane at that point. In other words a horizontal plane in the plane that is perpendicular to the line that passes through the center of the Earth.

Vertical plane, as used herein, refers in astronomy, geography, geometry, and related sciences and contexts, to a direction passing by a given point if it is locally aligned with the gradient of the Earth's gravity field, i.e., with the direction of the gravitational force (per unit mass, i.e. gravitational acceleration vector) at that point.

DETAILED DESCRIPTION OF THE PREFERRED EMBODIMENTS

The following description is of preferred embodiments by way of example only and without limitation to the combination of features necessary for carrying the invention into effect. Reference is to be had to the Figures in which identical reference numbers identify similar components. The drawing figures are not necessarily to scale and certain features are shown in schematic or diagrammatic form in the interest of clarity and conciseness.

FIG. 1 shows a first preferred embodiment of a fluid treatment system 10 for treating a contaminated fluid F having a gaseous contaminant C mixed or dissolved in the liquid portion L thereof. The fluid treatment system 10 comprises a generally enclosed and substantially airtight container 12 defining an interior volume 12$v$. The container 12 may comprise a bottom 12$b$, side walls 12$s$, and a top 12$t$. The container 12 is designed to contain and hold gases and liquids. A preferred material for the container is steel. More preferably, the container 12 is a pressure vessel suitable for pressures up to 15 psi and generally constructed of $\frac{3}{8}^{th}$ thick corrugated carbon steel, coated for sour service.

The container 12 may conveniently be in the form of a 35 foot long, by 8 foot wide, by 8 foot high generally rectangular tank, having an internal volume 12$v$ capacity of at least 325 barrels and being suitable for transportation by highway travel, such as by tractor semi-trailer, while staying within common weight and dimensions regulations. FIG. 2 illustrates one embodiment of such a generally rectangular tank, having a height H, a width W and a longitudinal axis LA that maybe held substantially along the horizontal plane when the container 12 is in operation or when it is transported. Other container dimensions, such as: (i) a 53 foot long, by 8 foot wide, by 8 foot high generally rectangular tank, having an internal volume 12$v$ capacity of at least 600 barrels and (ii) a 50 foot long, by 8 foot wide, by 8 foot high generally rectangular tank, having an internal volume 12$v$ capacity of at least 500 barrels, will also work.

Figure 7:
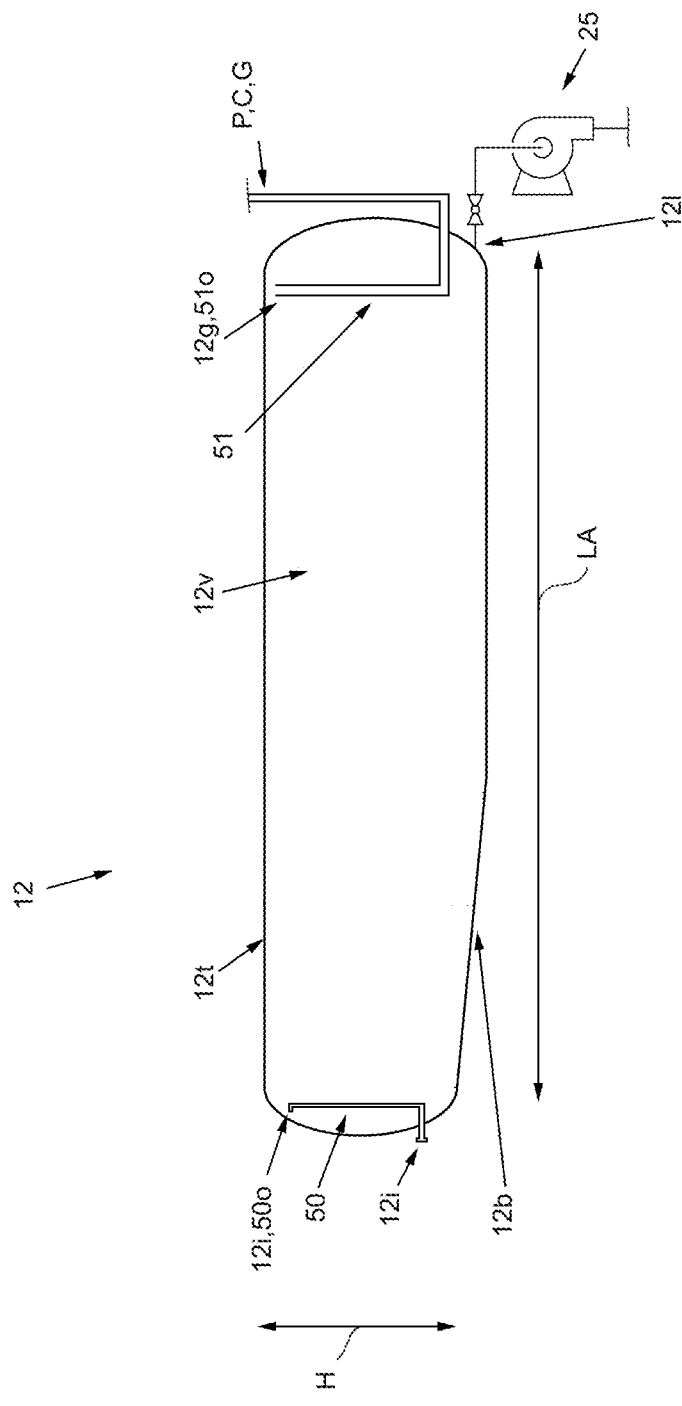
FIG. 7 is a sectioned perspective view of another embodiment of a container suitable for use in the fluid treatment system of the present invention.

The container 12 may also be substantially in the form of a cylinder, such as a fuel transport tank carried by a tractor semi-trailer. FIG. 7 illustrates one embodiment of such a generally cylindrical tank, having a height H and a longitudinal axis LA which maybe held substantially along the horizontal plane when the container 12 is in operation and/or when it is transported. The container 12 of the embodiment of FIG. 7 preferably has an interior volume 12$v$ of at least 200 barrels, a length (along the longitudinal axis LA) of at least 44 feet and a diameter of at least 6 feet.

The container 12 has at least one inlet 12$i$ to receive the contaminated fluid F and to subsequently direct said fluid F into the interior volume 12$v$ (either directly or via additional conduits, such as a diverter 50). The container also has at least one gas outlet 12$g$ to discharge any gaseous contaminant C, that may escape from the contaminated fluid F in gaseous form, out of the interior volume 12$v$.

The container 12 further comprises at least one liquid outlet 12$l$ to discharge any liquid L, separated from said contaminated fluid F, out of the interior volume 12$v$. The container is sealed to maintain a seal between the interior volume 12v and the outside environment, so as to prevent the escape and/or movement of any liquids and gasses out of the interior volume 12v, except as may be provided for via the inlet 12i, the gas outlet 12g or the liquid outlet 12l.

Preferably the inlet 12i is provided substantially at one end 13 of the container 12, while the gas outlet 12g and the liquid outlet 12l are provided at a substantially opposing end 14. More preferably, if the container is a generally rectangular tank having a longitudinal axis LA, the inlet 12i is provided substantially at one end 13 of the container 12 along the longitudinal axis LA, while the gas outlet 12g and the liquid outlet 12l are provided at a substantially opposing end 14 along the longitudinal axis LA.

The gas outlet 12g is preferably provided near the top 12t, so as to allow easy exit (or drawing off) of any gaseous contaminant C, while the liquid outlet 12l is preferably provided near the bottom 12b, so as to allow easy exit (or drawing off) of liquid L. The gas outlet 12g may be provided with a diverter 51 and opening 51o, to allow it to be functionally positioned within the container 12 and with opening 51o near the top 12t (see the embodiment of FIG. 7). Likewise, the liquid outlet may be provided with a stinger 52 or the like to allow an operator to draw off liquid L via the liquid outlet 12l at a level of only an inch or so above the bottom 12b (see the embodiment of FIG. 2).

The contaminated fluid F may come from a contaminated fluid source 20 such as a well, a storage tank or a separator, and a pump 20p may be provided to move contaminated fluid F from the source 20 into the container 12 and provide sufficient line pressure of the fluid F during operations. During operations a suitable line pressure is 200 psi, and a suitable flow rate for the fluid F into the interior volume 12v is up to 300 barrels per hour when the container's interior volume is at least 600 barrels.

Those skilled in the art can appreciate that the particular elements in the embodiments depicted in the figures are connected using typical connections known to those skilled in the art, such as the appropriate pipes, seals, caps, clamps, tubes, o-rings, valves, etc. (and as generally illustrated by the letter P). For example, a suitable pipe to provide contaminated fluid F from the source 20 to the inlet 12i is a 3 or 4 inch diameter steel pipe.

The contaminated fluid F is expected to be primarily liquid L, such as crude oil or water, with one or more gaseous contaminants C generally being dissolved or mixed therein. A common contaminant C that the system 10 can treat is hydrogen sulfide (H2S). But the system 10 is also suitable to treat fluid F contaminated with volatile organic compounds (VOC) or other gaseous contaminants C that readily escape or break out of liquid in a gaseous form at common atmospheric conditions.

During operation of the system 10, contaminated fluid F enters the interior volume 12v under pressure and will then rapidly expand into the greater volume provided for by the interior volume 12v. This will cause a significant portion of the gaseous contaminants C to separate or break-out from the liquid portion L. Gravity will cause the liquid portion L will fall or settle on the bottom 12b, while the gaseous contaminants C remain in the upper portion of the container or headspace HS, suitable then to exit out of the container 12 via the gas outlet 12g.

As more liquid L settles on the bottom 12b, the liquid level LL will rise or increase in height within the interior volume 12, reducing the volume of headspace HS. The liquid L may be drawn out from the container 12 via the liquid outlet 12l, such as by means of a suitable pump 25. Preferably, during operation, the liquid L is drawn out of the interior volume 12 (via liquid outlet 12l) at such a rate (or at such batch intervals) so as to keep the liquid level LL below half the tank's height H; i.e. so as to keep the headspace HS to at least fifty percent (50%) of the interior volume 12v. Liquid sensors may be provided to automate or trigger a pump 25 to draw out liquid L when the liquid level LL reaches a preset threshold along the height H of the container, e.g. at forty-five percent (45%) height, so as to ensure that the liquid level LL remains below half the tank's height.

Advantageously, by keeping the headspace HS to at least fifty percent of the interior volume 12v, most or all of the remaining gaseous contaminants C' in the liquid L will very quickly separate therefrom (into the headspace HS), thereby significantly increasing the efficiency of the system 10. In contrast, if the headspace HS was reduced to less than ten percent (10%) of the interior volume 12v, the vapor-liquid phase equilibrium of a gaseous contaminant C (such as hydrogen sulfide) may cause a larger portion of that contaminant C to remain dissolved or mixed within the fluid F, and then also the liquid portion L, as the fluid F settles in the container 12.

Any liquid L draw out of the container 12 via the liquid outlet 12l may be sampled at a sampling port S to determine what amount or percentage of gaseous contaminants C may still remain in the liquid portion L. If the liquid portion has be substantially treated and cleaned of gaseous contaminants C, it may be drawn off into a liquid storage or transport vessel 27. Alternatively, if the liquid portion still contains some contaminants C, it may be drawn off and then reintroduced into the container 12 via a recycling loop R that fluidly connects to the inlet 12i.

Any gaseous contaminants drawn off or exiting via the gas outlet 12g may be stored in suitable containers, flared off using a flare stack or, more preferably, treated using suitable gas scrubbers 29. For example, a SCRUBBER MAX™ HGR™ high gas rate scrubber made by Am-gas Services Inc. of Rockyview, Alberta, Canada is suited for controlling and removing toxic gases in high flow, low pressure venting applications (with a flow rate of 140 cubic meters/minute) and would be a suitable scrubber 29 when the contaminant C is hydrogen sulfide. Preferably, the gas outlet 12g is a six inch diameter outlet to facilitate easy connection to a gas scrubber 29 via pipes P, to handle a high gas flow rate and to allow for the carrier gas G to quickly purge the headspace HS of the container 12 so as to allow a system 10 (with a 53 foot×8 foot×8 foot container 12 having a 650 barrel internal volume 12v) to efficiently treat typical oil-field contaminated fluids F, such as sour oil with a hydrogen sulfide concentration of up to 500,000 ppm, at a rate of 325 barrels per hour.

Advantageously, by causing the gaseous contaminant C to separate from (or leave) the liquid portion L, the system 10 avoid the need for a chemical scavenger to be introduced into the liquid portion. More advantageously, if the fluid F is crude oil, no chemical scavenger is introduced into the liquid portion of the crude oil, thereby preventing any dithiazine buildup in downstream oil processing equipment, pipes and storage tanks; as would be the case with prior-art chemical scavenger treatment systems and methods.

Preferably, when treating typical fluids contaminated with hydrogen sulfide (H2S) the system 10 provides at least one (1) square foot, but more preferably at least 1.4 square feet, of surface area per barrel of contaminated fluid F being treated. The inventor has found that this amount or ratio of surface area per barrel of fluid encourages quick and almost instantaneous breakout or escape of any gaseous contaminants C (like hydrogen sulfide) from the liquid portion L. Thus a 53 foot long by 8 foot wide container 12 will provide a surface area of 424 square feet and should therefore be suitable to treat approximately 302 barrels of hydrogen sulfide contaminated fluid per hour. Advantageously, a horizontally oriented container 12, with its longitudinal axis LA substantially along the horizontal plane, will provide a much greater surface area to the liquid L on the bottom 12b per volume of liquid L than an upright/vertical container of the similar dimensions but having its longitudinal axis along the vertical plane. In that case, the surface area of such an upright/vertical container would only be 64 square feet (8 feet×8 feet) and, keeping the 1.4 square feet ratio (per barrel of fluid), would then really only be suitable to treat 46 barrels of H2S contaminated fluid F per hour.

Preferably, the system 10 further comprises a source 30 of carrier gas G which is introduced or mixed into the contaminated fluid F prior to the contaminated fluid F entering the interior volume 12v. The carrier gas G may be air or an inert gas, such as nitrogen gas (N2). The carrier gas G can be selected by those skilled in the art based on the carrier gas's ability to accept (i.e. "carry") the contaminant C away from the fluid F, while also being safe to handle. For example, air is generally suitable to accept hydrogen sulfide (H2S) contaminants from contaminated water. Air, however, may not be desirable as a carrier gas G when the contaminated fluid F is crude oil, due to the potential combustible and explosive reaction of the oxygen in the air with the hydrocarbons in the oil. As such, in the case where the contaminated fluid F is primarily crude oil, the carrier gas is preferably an inert gas such as nitrogen gas (N2) to decrease the probability of combustion. Advantageously, the carrier gas G also functions to purge or clear out the headspace HS volume on a continuous basis during operation of the system 10, thereby maintaining a favourable vapor-liquid phase equilibrium for any gaseous contaminant C (such as hydrogen sulfide), so that most or all of the remaining gaseous contaminants C' in the liquid L are caused to quickly separate therefrom (into the headspace HS and then out the gas outlet 12g). More advantageously, the carrier gas G creates additional turbulence to the contaminated fluid F when it enters the interior volume 12v (e.g. near the top 12t), thereby significantly increasing the efficiency of the initial break-out of gaseous contaminant C into the headspace HS and adding to the overall efficiency of the system 10.

Preferably, the carrier gas G is mixed into the contaminated fluid F under pressure, prior to the mixture of contaminated fluid and carrier gas F,G being released into the interior volume 12v. For example, the carrier gas G may already be held within a source 30 under sufficient pressure; e.g. at a pressure of at least 100 psi. Alternatively, the carrier gas G may be drawn from a source using a pump to achieve the desired pressure, prior to mixing with the contaminated fluid.

When the fluid F enters the interior volume 12v at a rate of up to 300 barrels per hour, the carrier gas G is preferably mixed into the contaminated fluid at a rate of 75 to 125 standard cubic feet per minute (scfm) if the carrier gas G is nitrogen, or at a rate of 150 to 350 scfm if the carrier gas is air.

The carrier gas G may be mixed into the contaminated fluid F using a mixer 40 such as mixing chamber 40c or a venturi 40v. The mixer 40 may be provided externally to the container 12, as in the embodiment of FIG. 1; or the mixer 40 may be provided inside the container 12, as in the embodiment of FIGS. 2 to 6.

The mixture of contaminated fluid and carrier gas mixture F,G is preferably released into the interior volume 12v near the top 12t of the container 12. This may be accomplished by having the inlet 12i located on the top 12t, as in the embodiment of FIG. 1. Or this may be accomplished by providing one or more rising diverters 50 to divert raise the contaminated fluid and carrier gas mixture F,G from an inlet 12i that may be near the bottom of the container 12 up to the top 12t, as in the embodiments of FIGS. 2 to 6. The diverters 50 receive the mixture F,G from the inlet 12v and have an outlet 50o that exits in the interior volume 12v near the top 12t. Advantageously, by allowing the inlet 12i to remain near the bottom of the container 12, a source of contaminated fluid 20 may be easily connected to the container 12 (via pipes P) by workers and operators on the ground. Rather than having to connect directly to the top 12t of an eight foot tall container 12.

More advantageously, by providing a carrier gas G, by premixing that carrier gas G into the fluid F prior to release into the interior volume and by releasing this mixture near the top 12t of container, the inventor has found that the gaseous contaminant C is quickly and very efficiently separated from the fluid F and into the headspace HS, with very little (if any) remaining in the liquid portion L; i.e. the vapor-liquid phase equilibrium of a gaseous contaminant C (such as hydrogen sulfide) is shifted in favour of the gaseous contaminant quickly and efficiently breaking-out of the liquid portion L. More advantageously, by providing a substantially rectangular container 12 with a height H of eight (8) feet, the container 12 will fit underneath bridges and meet most or all local vehicle and traffic regulations when transported on a semi-truck from one remote location to another. Even more advantageously, by providing a substantially rectangular container 12 with the inlet 12i (or the diverter 50 with opening 50o) at substantially one end 13 and with the gas outlet 12g at a substantially opposing end 14 along that length, a large volume of effective headspace HS is provided to allow gaseous contaminant C to escape from the liquid portion L before exiting out the gas outlet 12g; i.e. the vapor-liquid phase equilibrium of a gaseous contaminant C (such as hydrogen sulfide) is again shifted in favour of the gaseous contaminant quickly and efficiently breaking-out of the liquid portion L. Additionally, by having the inlet 12i (or the diverter 50 with opening 50o) at substantially one end 13 and with the gas outlet 12g at a substantially opposing end 14, any liquid or mist carry-over out the outlet is minimized, if not outright eliminated.

In any event, during operation, the liquid level LL is to be kept below both the inlet 12i (or the diverter's opening 50o) and the gas outlet 12o (or the diverter's opening 51o), so as to provide at least some continuous headspace HS within the interior volume 12v to allow gaseous contaminants C,C' and any carrier gas G to travel from the inlet 12i (or from the diverter's opening 50o), or from the liquid portion L, to the gas outlet 12o (or the diverter's opening 51o). Preferably, during operations, the liquid LL is kept at least one inch below both the inlet 12i (or the diverter's opening 50o) and at least one inch below the gas outlet 12o (or the diverter's opening 51o).

As noted above, preferably, the liquid level LL is kept below half the tank's height H; i.e. so as to keep the headspace HS to at least fifty percent (50%) of the interior volume 12v. However, the inventor has noted that keeping the headspace to at least 10% of the interior volume 12v will also work, with the greatest efficiencies begin found when the headspace HS is kept to at least fifteen percent (15%).

Finally, it is known that sulfur and sulfide oxidizing micro-organisms include both bacteria (e.g. *Thiobacillus* species) and Archaea (e.g. *Sulfolobus* species). Such oxidizers oxidize H2S (sulfide) or S (elemental sulfur) as a source of energy. Similarly, the purple and green sulfur bacteria oxidize H2S or S as an electron donor for photosynthesis. With respect to the system 10, the inventor has discovered that, when the contaminated fluid F being treated is water contaminated with hydrogen sulfide, the system 10 quickly and efficiently removes not only the hydrogen sulfide from the liquid portion L, but also any sulfur and sulfide oxidizing micro-organisms from the liquid portion L—since their energy source (H2S) is quickly removed. The inventor has observed cellular materials precipitating out of the liquid portion L and settling on the bottom 12b, as such sulfur and sulfide oxidizing micro-organisms die from lack of energy. Advantageously, the system 10 can now also be used to minimize (or eliminate) subsequent or down-stream waste water treatments, such as adding oxidizing chemicals, that would typically be used to kill any such micro-organisms in the liquid portion L.

Those of ordinary skill in the art will appreciate that various modifications to the invention as described herein will be possible without falling outside the scope of the invention. In the claims, the word "comprising" is used in its inclusive sense and does not exclude other elements being present. The indefinite article "a" before a claim feature does not exclude more than one of the features being present.

The embodiments of the invention in which an exclusive property or privilege is being claimed are defined as follows:

1. A fluid treatment system for treating a contaminated fluid having hydrogen sulfide mixed or dissolved in the liquid portion thereof, the system comprising:
   a generally enclosed and substantially airtight container defining an interior volume, the container further comprising:
      at least one inlet to receive the contaminated fluid;
      at least one gas outlet to discharge any hydrogen sulfide out of the interior volume;
      at least one liquid outlet to discharge any liquid that may be separated from said contaminated fluid;
   wherein, during operations, the container is sealed to maintain a seal between the interior volume and any outside environment, so as to prevent the escape and/or movement of any hydrogen sulfide out of the interior volume, except as may be provided for via the inlet, the gas outlet or the liquid outlet;
   the system further comprising:
   a high gas rate scrubber fluidly connected to the gas outlet, to receive and remove said hydrogen sulfide exiting from said at least one gas outlet;
   a source of carrier gas for premixing into the contaminated fluid, prior to entry of the contaminated fluid into the interior volume;
   an enclosed mixing chamber to receive said contaminated fluid and said carrier gas, and to mix the carrier gas with the contaminated fluid, prior to entry of the contaminated fluid into the interior volume;
   a recycling loop fluidly connecting the at least one liquid outlet with the mixing chamber;
   a pump to draw out a desired quantity of liquid from the interior volume via the recycling loop, and to recycle said quantity of liquid into the enclosed mixing chamber;
   wherein, during operations, a continuous headspace is maintained between the at least one inlet and the at least one gas outlet;
   wherein the interior volume provides at least 1 square foot of surface area per barrel of contaminated fluid being treated; and
   wherein the interior volume provides a square surface area of at least 424 square feet.

2. The fluid treatment system of claim 1 wherein the container further comprises a longitudinal axis and wherein, during operations, the container is positioned so that the longitudinal axis is held substantially along a horizontal plane; and
   wherein the inlet is provided substantially at one end of the container's longitudinal axis, while the at least one gas outlet is provided at a substantially opposing end of the container's longitudinal axis.

3. The fluid treatment system of claim 1 wherein the carrier gas is selected from one of: air or nitrogen.

4. The fluid treatment system of claim 1 wherein the container further comprises a longitudinal axis and wherein, during operations, the container is positioned so that the longitudinal axis is held substantially along a horizontal plane.

5. The fluid treatment system of claim 1, wherein the gas scrubber is a high gas rate scrubber able to remove toxic gases at a flow rate of at least 140 cubic meters/minute.

6. The fluid treatment system of claim 5, wherein the gas outlet has a diameter of at least six inches; and
   wherein the gas scrubber is connected to the gas outlet via at least one pipe.

* * * * *